Patented Sept. 27, 1949

2,483,235

UNITED STATES PATENT OFFICE 2,483,235

ESTERS OF PENICILLIN S-DIOXIDE

Edward F. Rogers, Middletown, and Karl Folkers, Plainfield, N. J., assignors to Merck & Co., Inc., Rahway, N. J., a corporation of New Jersey No Drawing. Application April 19, 1946, Serial No. 663,621

6 Claims. (Cl. 260—302)

This invention relates to certain new chemical compounds and to improved processes by which they may be prepared. More particularly, it is concerned with esters of penicillin S-dioxide and methods of preparing the same.

The compounds forming the subject matter of the present invention are believed to be represented by the formula:

I

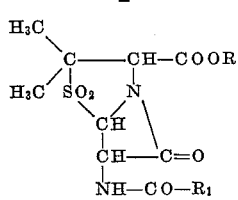

wherein R represents lower alkyl and aralkyl substituents. Lower alkyl radicals include methyl, ethyl, propyl, etc. and aralkyl includes such compounds as benzyl (—CH$_2$C$_6$H$_5$). R$_1$ represents benzyl and substituted benzyl substituents. By the term substituted benzyl compounds is meant compounds having the formula

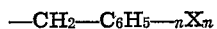

wherein X is alkoxy, acyloxy, hydroxy and halogen.

It has now been discovered in accordance with the present invention that compounds represented by the above formula can be prepared by oxidizing compounds of the general formula

II

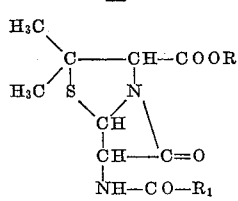

wherein R and R$_1$ represent the radicals mentioned above. Compounds of this general structure wherein R is a lower alkyl radical and R$_1$ is benzyl may be obtained by reacting penicillin G with a diazo compound such as diazomethane or diazoethane. This general process and the compounds thereby secured are disclosed and claimed in a co-pending joint application of one of the present applicants, Peck, Wolf and Folkers, Serial No. 636,256, filed December 20, 1945, now abandoned.

In accordance with a preferred embodiment of the present invention, the oxidation is accomplished by buffering an organic solvent solution of compounds represented by Formula II to neutrality, reacting the neutral solution with potassium permanganate at room temperature, reducing any excess potassium permanganate present with a reducing agent, such as sulfur dioxide, and recovering compounds represented by Formula I.

Our invention and the new compounds with which it is concerned, will be apparent from the following illustrative example:

Example

About 116 mg. of methyl penicillin G (represented by Formula II wherein R is a methyl substituent and R$_1$ is a benzyl substituent) were dissolved in 10 ml. of dioxane. The pH of the solution was adjusted to 6.8 by the addition of 5 ml. of 1.7 M phosphate buffer. 3.6 ml. of 3.88% potassium permanganate solution were added and the mixture was stirred for one hour at 25° C. Sulfur dioxide was then added until the permanganate color was discharged. The solution was concentrated to approximately one quarter of the initial volume at room temperature and then extracted with three equal volumes of chloroform. Evaporation of the chloroform in vacuo resulted in a residue which crystallized on the addition of ether. This material, methyl penicillin-G S-dioxide, had a melting point of 173–174° C. During the melting point determination a slight softening of the crystals was noted at 150–155° C. Upon recrystallization from chloroform-ether, crystals of irregular plates were obtained. These crystals melted with decomposition at 173–174° C., and had an optical rotation of $(\alpha)_D^{25}$ +172° when measured in an 0.8% chloroform solution and +192° when measured in a 1.0% dioxane solution. The esters of penicillin G. S-dioxide have 10–20% of the activity of penicillin and are much more stable than penicillin in acid solution. This adapts the new compounds for oral or topical medication where acid conditions normally prevail.

Various changes and modifications of our invention as described above may be made which would still be within the scope thereof. Accordingly, such changes and modifications, to the extent that they are within the purview of the appended claims are to be regarded as part of our invention.

We claim:
1. A compound of the formula

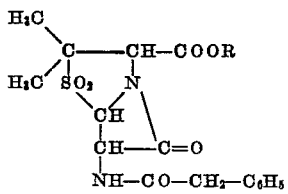

wherein R is selected from the group consisting of lower alkyl and aralkyl.

2. A compound of the formula

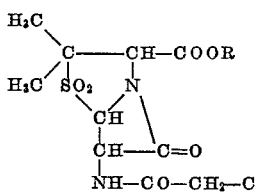

wherein R represents a lower alkyl substituent.

3. Methyl penicillin-G. S-dioxide having a melting point of approximately 173–174° C., an optical rotation of approximately $(\alpha)_D^{25}+172°$ when measured in 0.8% chloroform solution, an optical rotation of approximately $(\alpha)_D^{25}+192°$ when measured in 1.0% dioxane solution and having the following structural formula

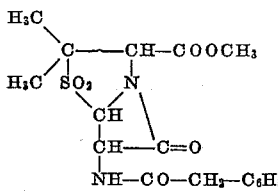

4. The process that comprises buffering to neutrality an organic solvent solution of a compound of the formula

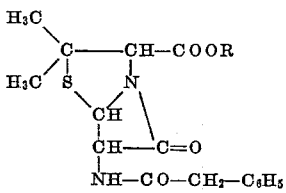

wherein R is selected from the group consisting of lower alkyl and aralkyl, reacting the neutral solution with potassium permanganate, reducing any excess potassium permanganate with sulfur dioxide and recovering a compound of the formula

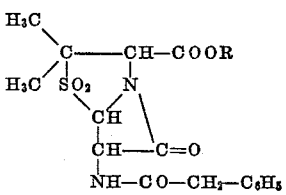

wherein R is as above.

5. The process that comprises buffering an organic solvent solution of compounds of the formula

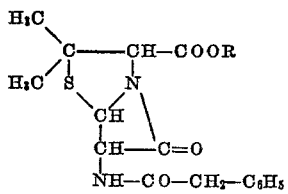

wherein R represents a lower alkyl substituent to neutrality, reacting the neutral solution with potassium permanganate, reducing any excess potassium permanganate with sulfur dioxide and recovering compounds of the formula

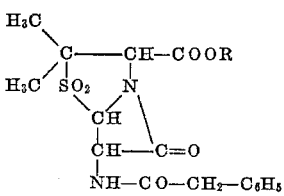

wherein R is as above.

6. The process that comprises buffering to neutrality an organic solvent solution of methyl penicillin G having the formula

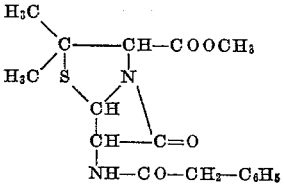

and reacting the neutral solution with potassium permanganate to form methyl penicillin G. S-dioxide having the formula

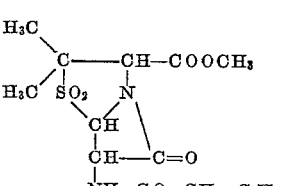

EDWARD F. ROGERS.
KARL FOLKERS.

REFERENCES CITED

The following references are of record in the file of this patent:

Abraham: British Journal of Experimental Pathology, vol. 23, June 1942, No. 3, page 112.

Squibb Institute for Medical Research Monthly Progress Report for April 1944, SX IV, page 5.